(12) United States Patent
Laslo

(10) Patent No.: US 9,700,837 B2
(45) Date of Patent: Jul. 11, 2017

(54) WET SCRUBBER NOZZLE SYSTEM AND METHOD OF USE FOR CLEANING A PROCESS GAS

(71) Applicant: ALSTOM Technology Ltd, Baden (CH)

(72) Inventor: Dennis James Laslo, Ten Mile, TN (US)

(73) Assignee: General Electric Technology GmbH, Baden (CH)

( * ) Notice: Subject to any disclaimer, the term of this patent is extended or adjusted under 35 U.S.C. 154(b) by 547 days.

(21) Appl. No.: 13/945,425

(22) Filed: Jul. 18, 2013

(65) Prior Publication Data

US 2015/0023855 A1   Jan. 22, 2015

(51) Int. Cl.
| | |
|---|---|
| *B01D 53/14* | (2006.01) |
| *B01D 53/40* | (2006.01) |
| *B01D 53/50* | (2006.01) |
| *B01D 53/62* | (2006.01) |
| *F01N 3/08* | (2006.01) |
| *B01D 53/18* | (2006.01) |
| *B01D 53/78* | (2006.01) |
| *F23J 15/04* | (2006.01) |

(52) U.S. Cl.
CPC ........... *B01D 53/40* (2013.01); *B01D 53/185* (2013.01); *B01D 53/504* (2013.01); *B01D 53/507* (2013.01); *B01D 53/62* (2013.01); *B01D 53/78* (2013.01); *F01N 3/085* (2013.01); *F01N 3/0857* (2013.01); *F23J 15/04* (2013.01); *B01D 2251/206* (2013.01); *B01D 2251/304* (2013.01); *B01D 2251/404* (2013.01); *B01D 2252/204* (2013.01); *B01D 2257/302* (2013.01); *B01D 2257/304* (2013.01); *B01D 2257/504* (2013.01); *B01D 2258/0283* (2013.01); *B01D 2259/124* (2013.01); *B01D 2259/126* (2013.01); *F23J 2215/20* (2013.01); *F23J 2219/40* (2013.01); *Y02E 20/326* (2013.01)

(58) Field of Classification Search
None
See application file for complete search history.

(56) References Cited

U.S. PATENT DOCUMENTS 6,322,617 B1 * 11/2001 Wurz ..................... B01D 47/06
239/463

FOREIGN PATENT DOCUMENTS

| JP | 2013111527 A | 6/2013 |
|---|---|---|
| WO | 98/37947 A1 | 9/1998 |
| WO | WO2012/076947 | 6/2013 |

* cited by examiner

*Primary Examiner* — Anita Nassiri Motlagh
(74) *Attorney, Agent, or Firm* — GE Global Patent Operation; Rita D. Vacca

(57) ABSTRACT

A wet scrubber (10) useful for cleaning a process gas (F) comprising at least a first spray level system (40) and a second spray level system (48) arranged compactly vertically above the first spray level system (40) in a wet scrubber tower (14). Each spray level system (40, 48) is equipped with a plurality of atomizing flattened relatively wide spray angle nozzles (56) for atomizing an absorption liquid (AL) supplied thereto for contact and intermixing with the process gas (F) for removal of environmental pollutants therefrom.

15 Claims, 2 Drawing Sheets

WET SCRUBBER NOZZLE SYSTEM AND METHOD OF USE FOR CLEANING A PROCESS GAS

FIELD OF THE INVENTION

Figure 1:
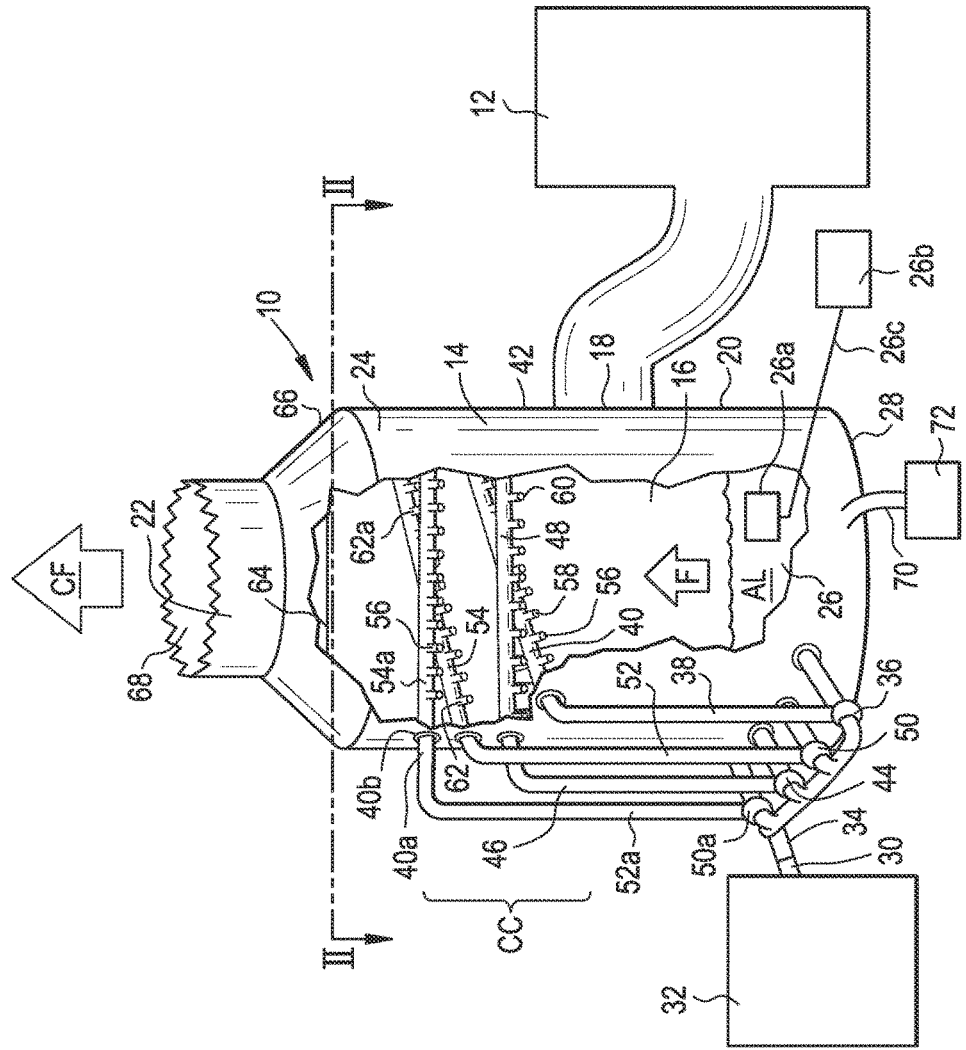

The present invention relates to a nozzle system and a method of using the same to clean a process gas. The subject nozzle system is useful in a wet scrubber tower of a wet scrubber. Arranged within a wet scrubber tower of a wet scrubber, the subject nozzle system comprises at least a first spray level system equipped with a plurality of nozzles to which an absorption liquid is supplied for atomization thereby, and a second spray level system equipped with a plurality of nozzles arranged vertically above the first spray level system in the wet scrubber tower to which an absorption liquid is likewise supplied for atomization thereby.

The present invention further relates to a wet scrubber useful for cleaning a process gas and a method for using the same to clean a process gas.

BACKGROUND OF THE INVENTION

Combustion of a fuel, such as coal, oil, peat, waste, etc., in a combustion plant, such as a power plant, generates a hot process gas containing, among other components, sulfur oxides, $SO_x$, such as sulfur dioxide, $SO_2$, and carbon dioxide, $CO_2$. Sulfur dioxide is an environmental pollutant. Hence, it is necessary to remove at least a portion of the sulfur dioxide contained in a process gas before releasing the process gas into the atmosphere. Furthermore, with increasing focus on the negative environmental impact of carbon dioxide gas, it has also become important to remove carbon dioxide from process gas before releasing it to the atmosphere.

Conventional wet scrubber spray towers have several spray level systems spaced at intervals of typically two to three meters with atomizing nozzles providing a spray cone angle of approximately 90 degrees to approximately 120 degrees in one direction or sometimes in two directions.

WO 2012/076947 describes a somewhat conventional wet scrubber improved through the use of contact plates. A method of using the same includes deflecting absorption liquid atomized by means of nozzles of a second spray level system from the vicinity of at least one nozzle of a first spray level system. As such, the first spray level system is arranged vertically below the second spray level system with a deflecting contact plate located vertically above the at least one nozzle of the first spray level system. Absorption liquid deflected by the deflecting contact plate contacts process gas just previously contacted by absorption liquid atomized by the at least one nozzle of the first spray level system.

SUMMARY OF THE INVENTION

An object of the present invention is to provide a wet scrubber and a method of using the wet scrubber to clean a process gas more efficiently and at lower cost than the prior art wet scrubber and method described above.

This object is achieved by means of the subject wet scrubber and method of cleaning a process gas using the subject wet scrubber. The subject wet scrubber comprises a wet scrubber tower with the subject nozzle system arranged within the wet scrubber tower. The subject nozzle system comprises at least a first spray level system equipped with a plurality of nozzles arranged within the wet scrubber tower to which an absorption liquid is supplied for atomization by the plurality of nozzles, and a second spray level system equipped with a plurality of nozzles arranged within the wet scrubber tower vertically above the first spray level system to which an absorption liquid is supplied for atomization by the plurality of nozzles in the second spray level system. The subject nozzle system may comprise from two to six vertically "stacked" spray level systems, but for most purposes from two to three or four vertically stacked spray level systems for efficiently cleaning a process gas to on the average meet or exceed regulatory standards.

Nozzles suitable for the subject nozzle system provide a flattened relatively wide spray angle of approximately 150 degrees to approximately 180 degrees. Commercially available nozzles capable of providing the desired flattened relatively wide spray angle, for instance widened flat fan-like sprays or widened hollow sprays, are manufactured by Spraying Systems in Wheaton, Ill. 60187 USA, Bete Fog Nozzle in Greenfield, Mass. 01301 USA and Lechler in St. Charles, Ill. 60174 USA. Using nozzles that provide the desired flattened relatively wide spray angle allows for relatively close "stacking" of spray level systems within the wet scrubber tower. Hence, the spray zone, i.e., the area measuring vertically from the bottom most spray level system to the upper most spray level system, is significantly reduced while delivering the same amount of liquid. The advantage is an extremely high density spray of absorption liquid in all directions within a reduced spray zone thus allowing intimate gas/absorption liquid contact with minimal equipment size, energy use and pressure drop.

Each spray level system, e.g., two to approximately six, within the wet scrubber tower is arranged a distance of approximately 0.3 to 0.5 meters from the spray level system (s) arranged vertically directly above and/or below it. Nozzles delivering flattened sprays also allow for wall mounting that provides additional benefits, such as for example reduced pressure drop. Each spray level system is equipped with an inlet fluidly connected to an absorption liquid supply for a supply of absorption liquid thereto. Each inlet comprises a point of entry into the wet scrubber tower that is horizontally offset approximately at least 10 to 20 degrees from the point(s) of entry within the wet scrubber tower of the inlet(s) from the spray level system(s) arranged vertically directly above and/or below it. As such, the subject wet scrubber comprises a wet scrubber tower equipped with at least two spray level systems requiring approximately one meter or less of wet scrubber tower spray zone vertical height as compared to prior art systems with the same number of spray levels requiring approximately 6 to 10 meters of wet scrubber tower spray zone vertical height. The offset absorption liquid inlets and flattened relatively wide spray angle nozzles of the subject system allows for a more compact arrangement of spray level systems and nozzles within the wet scrubber tower. This more compact arrangement provides a higher density of absorption liquid spray in all directions within the spray zone. This higher density spray causes intense liquid/gas intermixing, producing what could be referred to as a "cloud" of absorption liquid and process gas. This cloud of absorption liquid and process gas yields very efficient absorption of process gas contaminants, such as sulphur dioxide and other acid gases, by the absorption liquid in the wet scrubber tower. The higher density spray likewise eliminates process gas stratification and absorption avoidance, thus further enhancing process gas cleaning efficiency.

A method of using the subject wet scrubber comprises arranging the subject at least first and second spray level systems each equipped with a plurality of flattened relatively wide spray angle nozzles within approximately 0.3 to approximately 0.5 meter of wet scrubber tower vertical height, arranging absorption liquid inlets for each of the at least first and second spray level systems with points of entry into the round or circular wet scrubber tower horizontally offset at least approximately 10 to approximately 20 circular degrees apart one from the other, supplying absorption liquid through the absorption liquid inlets to the at least first and second spray level systems for absorption liquid atomization by the plurality of flattened relatively wide spray angle nozzles, and passing an upward vertical flow of process gas through the wet scrubber tower at a velocity of 5 to 15 m/s for process gas and absorption liquid contact to produce a cleaned process gas.

A velocity of 5 to 15 m/s for process gas flow through the wet scrubber tower for absorption liquid contact is preferred since process gas velocities less than 5 m/s, tend to result in less efficient absorption liquid and process gas intermixing. Similarly, with process gas velocities greater than 15 m/s, the process gas pressure drop within the wet scrubber tower tends to increase to unacceptably high levels. High pressure drop levels are unacceptable due to the large amount of energy and associated high costs required to pass process gas through and out of the wet scrubber tower. Also, with process gas velocities greater than 15 m/s, a large amount of absorption liquid becomes entrained within the process gas, causing increased liquid loads on wet scrubber tower mist eliminators, potentially causing undesirable increased absorption liquid losses from the wet scrubber tower.

In summary, described herein is a wet scrubber for cleaning a process gas that comprises a wet scrubber tower, at least a first spray level system to which an absorption liquid is supplied for atomization by nozzles comprised in the first spray level system, and a second spray level system which is arranged vertically above the first spray level system in the wet scrubber tower and to which an absorption liquid is supplied for atomization by nozzles comprised in the second spray level system, each spray level system inlet is horizontally offset from the other and arranged within a compact vertical height, and each nozzle is a flattened wide spray angle nozzle atomizing absorption liquid within interior of wet scrubber tower for environmental pollutant removal from a process gas comprising environmental pollutants passed through wet scrubber tower to produce a cleaned process gas. The subject wet scrubber has a compact vertical height of approximately 0.3 to 0.5 meter with a process gas passed therethrough at an approximate velocity of 5-15 m/s. The absorption liquid sprayed within the wet scrubber is a limestone slurry, an alkaline sodium solution, or alternatively, an ammoniated solution or an amine solution. The subject nozzles atomize the absorption liquid with a nozzle spray angle of approximately 150 to 180 degrees for the removal of environmental pollutants, such as sulphur dioxide or an acid gas.

The subject method of cleaning a process gas comprising an environmental pollutant using a wet scrubber comprises compactly arranging at least first and second spray level systems each equipped with a plurality of flattened wide spray angle nozzles within an interior of a wet scrubber tower, arranging absorption liquid inlets for each of the at least first and second spray level systems horizontally offset apart one from the other, supplying absorption liquid through the absorption liquid inlets to the at least first and second spray level systems for absorption liquid atomization by the plurality of flattened wide spray angle nozzles, and passing an upward vertical flow of process gas through the wet scrubber tower for absorption liquid contact and environmental pollutant removal to produce a cleaned process gas. For the described method, the at least first and second spray level systems are compactly arranged within approximately 0.3 to about 0.5 meter vertical height with absorption liquid inlets horizontally offset by at least approximately 10 to about 20 degrees one from the other. Nozzles of the subject method are flattened wide spray angle nozzles that provide a spray angle of approximately 150 to about 180 degrees. Process gas flowing vertically upwardly through the wet scrubber tower flows at a velocity of about 5-15 m/s to contact the absorption liquid, which is a limestone slurry, an alkaline sodium solution, an ammoniated solution or an amine solution for environmental pollutant, e.g., sulphur dioxide, carbon dioxide or acid gas, removal.

Further objects and features of the present invention will be apparent from the following detailed description and claims.

BRIEF DESCRIPTION OF THE DRAWINGS

The subject invention is described in more detail below with reference to the appended drawings in which:

FIG. 1 is a schematic side perspective partial cut-away view of a wet scrubber in accordance with a first embodiment.

FIG. 2 is a schematic top view of a spray level system of the wet scrubber of FIG. 1 taken along line II-II just below mist eliminators.

DESCRIPTION OF PREFERRED EMBODIMENTS

FIG. 1 illustrates a wet scrubber 10. The wet scrubber 10 is operative for removing at least a portion of the sulphur dioxide content and similar environmental pollutants comprised in a process gas, in the form of a flue gas, F, generated in a boiler 12 operative for combusting a fuel, such as coal, oil, peat, waste and the like. Process gas and flue gas F are considered synonymous and used interchangeably throughout the subject description.

Wet scrubber 10 comprises a vertical open circular or round wet scrubber tower 14 with interior 16, a process gas inlet 18 arranged in a base portion 20 of wet scrubber tower 14 for flow of flue gas, F, from fluidly connected boiler 12. Flue gas F from boiler 12 flows into fluidly connected interior 16, of wet scrubber tower 14 for cleaning and flows out of process gas outlet 22 arranged in an upper portion 24 of wet scrubber tower 14 as a cleaned flue gas, CF. Cleaned flue gas CF is flue gas from which at least a portion of the sulphur dioxide content and similar environmental pollutants has been removed. As illustrated in FIG. 1 as a vertical, upwardly pointed arrow, flue gas F travels substantially vertically upward inside interior 16 of wet scrubber tower 14 and out of wet scrubber tower 14 as cleaned flue gas CF.

An absorption liquid tank 26 is arranged at the bottom 28 of base portion 20 of wet scrubber tower 14. Absorption liquid tank 26 is equipped with a fluidly connected oxidation arrangement 26*a*. An absorbent, such as fresh limestone, $CaCO_3$, or an alkaline sodium solution, is supplied to absorption liquid tank 26 from a fluidly connected absorbent supply device 30 fluidly connected to a limestone or alkaline sodium solution storage area 32 and a supply pipe 34. It will be appreciated that absorption liquid tank 26 may, as an alternative, be positioned outside of wet scrubber tower 14, and that the supply of limestone or alkaline sodium solution could, as an alternative, enter wet scrubber 10 at other locations, as a dry powder, a slurry or both.

Wet scrubber 10 further comprises a first circulation pump 36 which circulates in a fluidly connected absorption liquid circulation pipe 38, an absorption liquid, sometimes referred to as a limestone slurry or an alkaline sodium solution. Absorption liquid is pumped by first circulation pump 36 from absorption liquid tank 26 through fluidly connected circulation pipe 38 to an absorption liquid inlet 40a at point of entry 40b into wet scrubber tower 14 fluidly connected to first spray level system 40 arranged horizontally across interior 16 in mid portion 42 of wet scrubber tower 14 adjacent base portion 20. Wet scrubber 10 further comprises a second circulation pump 44 which circulates in a fluidly connected absorption liquid circulation pipe 46, an absorption liquid from fluidly connected absorption liquid tank 26. Absorption liquid is pumped by second circulation pump 44 through fluidly connected circulation pipe 46 to an absorption liquid inlet 40a at point of entry 40b into wet scrubber tower 14 fluidly connected to second spray level system 48 arranged horizontally across interior 16 in mid portion 42 of wet scrubber tower 14 vertically about 0.3 to about 0.5 meters above first spray level system 40. Wet scrubber 10 further comprises a third circulation pump 50 which circulates in a fluidly connected absorption liquid circulation pipe 52, an absorption liquid from fluidly connected absorption liquid tank 26. Absorption liquid is pumped by third circulation pump 50 through fluidly connected circulation pipe 52 to an absorption liquid inlet 40a at point of entry 40b into wet scrubber tower 14 fluidly connected third spray level system 54 arranged horizontally across interior 16 in mid portion 42 of wet scrubber tower 14 above second spray level system 48. Wet scrubber 10 further comprises a fourth circulation pump 50a which circulates in a fluidly connected absorption liquid circulation pipe 52a, an absorption liquid from fluidly connected absorption liquid tank 26. Absorption liquid is pumped by fourth circulation pump 50a through fluidly connected circulation pipe 52a to an absorption liquid inlet 40a at point of entry 40b into wet scrubber tower 14 fluidly connected to fourth spray level system 54a arranged horizontally across interior 16 in mid portion 42 of wet scrubber tower 14 above third spray level system 54. Distance CC illustrated in FIG. 1, is determined by measuring from the vertical mid-point of the point of entry 40b of one spray level system, e.g., the first spray level system 20, to the vertical mid-point of the point of entry 40b of another spray level system, e.g., the fourth spray level system 54a. Distance CC is preferably approximately 0.3 m to about 0.5 m per spray level system within distance CC. Distance CC is significantly reduced in the subject embodiment due to use of a plurality of flattened relatively wide spray angle nozzles 56 equipped on each spray level system without unwanted absorption liquid spray interference between adjacent spray level systems that causes decreased sulphur dioxide removal efficiency. A greater distance CC is less preferable, since a greater distance CC increases the overall vertical height of wet scrubber tower 14 required, thus increasing investment and operating costs. It will be appreciated that a wet scrubber 10 could comprise more or less than four spray level systems, for example 2 to 10 spray level systems arranged in interior 16 of wet scrubber tower 14.

First spray level system 40 comprises a tubular portion 58 equipped with a number of fluidly connected atomizing nozzles 56 to finely distribute absorption liquid supplied thereto by pump 36. Absorption liquid is finely distributed by nozzles 56 to achieve effective contact between the absorption liquid and the flue gas flowing upwardly through interior 16 of wet scrubber tower 14. All or some of nozzles 56 may, for example, be commercially available nozzles capable of providing the desired flattened relatively wide spray angle, for instance widened flat fan-like sprays or widened hollow sprays, manufactured by Spraying Systems in Wheaton, Ill. 60187 USA, Bete Fog Nozzle in Greenfield, Mass. 01301 USA and Lechler in St. Charles, Ill. 60174 USA. This type of flattened relatively wide angle of approximately 150 to about 180 degrees atomizing nozzle is operative for a liquid flow of about 17 m$^3$/hour, corresponding to 17000 liters/hour, or 280 liters/minute, at a spraying pressure measured using water, of about 0.5 bar.

Second spray level system 48 is similar if not identical to first spray level system 40 and comprises a tubular portion 60 equipped with a number of fluidly connected atomizing nozzles 56. Third spray level system 54 comprises a tubular portion 62 equipped with a number of atomizing nozzles 56. Fourth spray level system 54a comprises tubular portion 62a with a number of atomizing nozzles 56.

A mist eliminator 64 is located above fourth spray level system 54a or the upper most spray level system in the wet scrubber tower 14. Mist eliminator 64 arranged horizontally across interior 16 in upper portion 66 adjacent to process gas outlet 68, removes at least a portion of the absorption liquid droplets entrained by cleaned flue gas, CF. Hence, absorption liquid droplets are removed from cleaned flue gas CF as the cleaned flue gas flows upwardly through interior 16 of wet scrubber tower 14, prior to exiting wet scrubber 10 via process gas outlet 68.

In wet scrubber 10, sulphur dioxide, $SO_2$, and similar such acid gases in the flue gas reacts with limestone, $CaCO_3$, or alternatively an alkaline sodium solution, in the absorption liquid to form calcium sulphite, $CaSO_3$, which is subsequently oxidized to form gypsum, $CaSO_4$. The oxidation of calcium sulphite is preferably performed by bubbling air or oxygen gas through the absorption liquid using oxidation arrangement 26a fluidly connected to an air or oxygen source 26b via source pipe 26c. Hence, the absorption liquid comprises, in addition to the limestone, also small amounts of calcium sulphite and, as a major constituent, gypsum. Gypsum formed through this process is removed from wet scrubber 10 via a fluidly connected disposal pipe 70 to a fluidly connected gypsum dewatering unit 72. The dewatered gypsum may be commercially used, for example in wallboard production.

In addition to sulphur dioxide, $SO_2$, wet scrubber 10 removes, at least partly, other contaminants from the flue gas also. Examples of such other contaminants include sulphur trioxide, $SO_3$, hydrochloric acid, HCl, hydrofluoric acid, HF, and other acidic process contaminants. Still further, wet scrubber 10 may also remove, at least partly, other types of contaminants from the flue gas, such as for example dust particles and mercury.

Figure 2:
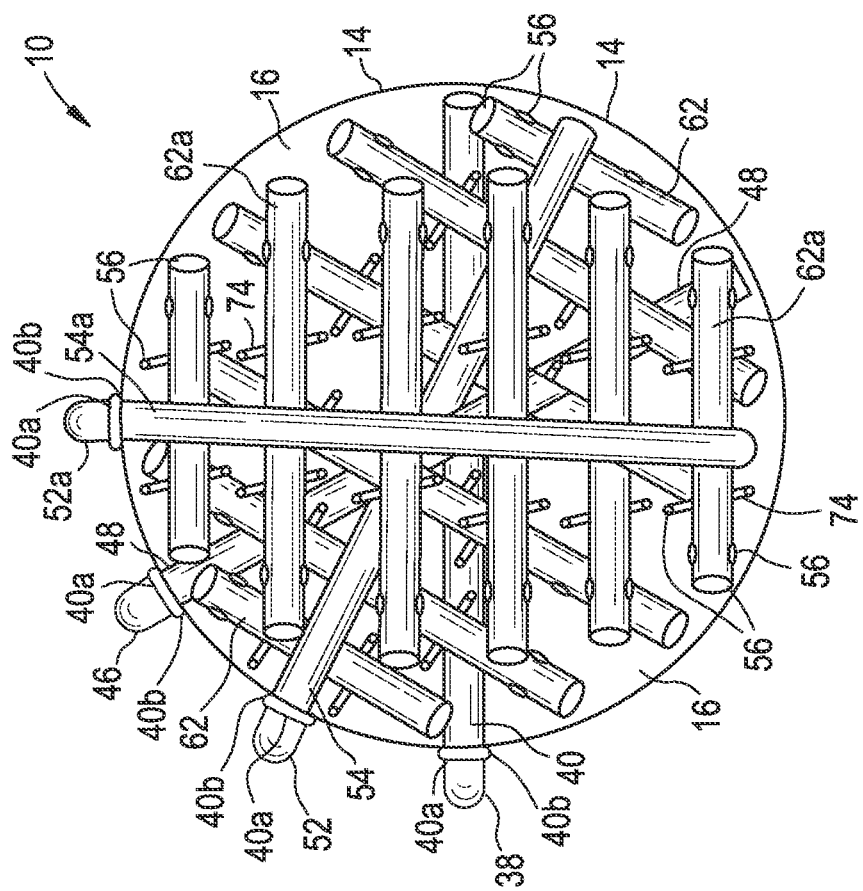

FIG. 2 illustrates a schematic top view from line II-II of FIG. 1 of the spray level systems within interior 16 of wet scrubber tower 14. Each of the spray level systems has the same principal design equipped with a number of fluidly connected perpendicular tubular extensions 74 forming a "grid" with and extending from the spray level tubular portions 40, 48, 54 and 54a. Atomizing nozzles 56 fluidly connect to tubular extensions 74 and also optionally tubular portions 40, 48, 54 and 54a so that the plurality of nozzles 56 are rather evenly distributed over the entire horizontal cross-section of wet scrubber tower 14 interior 16.

Typically, the number of nozzles 56 in each spray level system 40, 48, 54, 54a would range from about 4 to about 500. In accordance with one embodiment, substantially all of the absorption liquid supplied to nozzles 56 is sprayed in all directions within interior 16, i.e., into the flow of flue gas through wet scrubber tower 14. As such, nozzles 56 atomize absorption liquid supplied thereto and generate a spray cloud SC of absorption liquid. In this spray cloud SC is an intense intermixing of flue gas F and absorption liquid AL. Typically, vertical flue gas velocity may be approximately 5 to 15 m/s, often 6 to 10 m/s, through wet scrubber tower 14. However, absorption liquid AL in the spray cloud SC dissipates, clears or drains from the flue gas F quite slowly. Slow absorption liquid AL dissipation results in bubbling beds of turbulence within wet scrubber tower 14. The intense mixing of absorption liquid AL and flue gas F in the spray clouds SC results in increased sulphur dioxide absorption levels and thereby efficient removal of sulphur dioxide from flue gas F. Absorption liquid AL eventually drains from spray cloud SC, after having a relatively long average residence time in the spray cloud SC before draining therefrom.

Within wet scrubber tower 10, nozzles 56 are arranged so that at least half of the absorption liquid supplied thereto is sprayed in a horizontal, perpendicular to flue gas flow direction. In fact, all of the absorption liquid may be sprayed in a generally horizontal, perpendicular to flue gas flow direction, as an alternative to spraying in all directions. Spraying absorption liquid in spray cloud SC in a generally horizontal direction or alternatively in all directions from each of the spray level system is arranged to cover the entire interior 16 spray zone represented by distance CC with a spray cloud SC formed upon flue gas F contacting absorption liquid AL. Absorption liquid AL sprayed from nozzles 56 clean a process gas more efficiently and at a lower cost than the prior art wet scrubber and method described above.

It will be appreciated that numerous variants of the embodiments described above are possible within the scope of the appended claims.

A method of using the subject wet scrubber 10 comprises compactly arranging at least first and second spray level systems 40, 48 each equipped with a plurality of flattened relatively wide spray angle nozzles 56 within approximately 0.3 to approximately 0.5 meter of interior 16 wet scrubber tower 14 vertical height distance CC, arranging absorption liquid inlets 40*a* for each of the at least first and second spray level systems 40, 48 with points of entry 40*b* into the wet scrubber tower 14 horizontally offset at least approximately 10 to approximately 20 degrees apart one from the other, supplying absorption liquid AL through the absorption liquid inlets 40*a* to the at least first and second spray level systems 40, 48 for absorption liquid AL atomization by the plurality of flattened relatively wide spray angle nozzles 56, and passing an upward vertical flow of process gas F through the wet scrubber tower 14 at a velocity of 5 to 15 m/s for process gas F and absorption liquid AL contact. The process gas F and absorption liquid AL contact provides for sulphur dioxide and similar environmental pollutant removal to produce a cleaned process gas CF.

Hereinbefore, a method and a wet scrubber for removing sulphur dioxide from a process gas are described. It will be appreciated that the described method and wet scrubber may also be utilized for removing other contaminants from a process gas. For example, the subject method and wet scrubber could be utilized for removing carbon dioxide from a process gas. The removal of carbon dioxide from the process gas may, in such a case, often be conducted in a wet scrubber which is of a similar type or the same type as the wet scrubber operating for sulphur dioxide removal, but which is located downstream, with respect to the direction of process gas flow, of the wet scrubber in which sulphur dioxide is removed. Furthermore, while limestone may often be part of the absorption liquid in a sulphur dioxide removing wet scrubber, a carbon dioxide removing wet scrubber may utilize another type of absorption liquid, for example an absorption liquid comprising an ammoniated solution or an amine solution.

To summarize, a wet scrubber tower 14 cleaning a process gas F comprises a first spray level system 40 and a second spray level system 48 which is arranged compactly, e.g., within 0.3 to 0.5 meter vertically above the first spray level system 40 within interior 16 of wet scrubber tower 14, each spray level system 40, 48 comprising nozzles 56 operative for atomizing absorption liquid AL in a flattened relatively wide spray angle in a horizontal direction perpendicular to the flow of flue gas F through the wet scrubber tower 14 or in all directions within wet scrubber tower 14. The atomized absorption liquid AL contacts the process gas F for process gas F and absorption liquid AL intermixing to remove sulphur dioxide and produce a cleaned flue gas.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A wet scrubber for cleaning a process gas comprising:
a wet scrubber tower, at least a first spray level system to which an absorption liquid is supplied for atomization by nozzles comprised in the first spray level system, and a second spray level system which is arranged vertically above the first spray level system in the wet scrubber tower and to which an absorption liquid is supplied for atomization by nozzles comprised in the second spray level system;
each spray level system inlet is horizontally arranged by at least 10 to 20 degrees from the other for a concomitant horizontal offset of the nozzles arranged thereon and arranged within a compact vertical height;
each spray level system comprising a tubular portion, a number of tubular extensions extending perpendicularly from the tubular portion, and nozzles fluidly connected to the tubular portion and to the number of tubular extensions; and
each nozzle is a flattened wide spray angle nozzle atomizing absorption liquid within interior of wet scrubber tower for environmental pollutant removal from a process gas comprising environmental pollutants passed through wet scrubber tower to produce a cleaned process gas.

2. A wet scrubber according to claim 1, wherein the compact vertical height is approximately 0.3 to 0.5 meter.

3. A wet scrubber according to claim 1, wherein the process gas is passed through wet scrubber tower at an approximate velocity of 5-15 m/s.

4. A wet scrubber according to claim 1, wherein the absorption liquid is a limestone slurry or an alkaline sodium solution.

5. A wet scrubber according to claim 1, wherein the absorption liquid is an ammoniated solution or an amine solution.

6. A wet scrubber according to claim 1, wherein the nozzle spray angle is approximately 150 to 180 degrees.

7. A wet scrubber according to claim 1, wherein the environmental pollutant is sulphur dioxide.

8. A wet scrubber according to claim 1, wherein the environmental pollutant is an acid gas.

9. A method of cleaning a process gas comprising an environmental pollutant using a wet scrubber comprising:
   compactly arranging at least first and second spray level systems each equipped with a plurality of flattened wide spray angle nozzles within an interior of a wet scrubber tower, with each spray level system comprising a tubular portion, a number of tubular extensions extending perpendicularly from the tubular portion, and the plurality of flattened wide spray angle nozzles fluidly connected to the tubular portion and the tubular extensions;
   horizontally arranging absorption liquid inlets for each of the at least first and second spray level systems at least 10 to 20 degrees apart one from the other for a concomitant horizontal offset of the nozzles arranged thereon;
   supplying absorption liquid through the absorption liquid inlets to each of the at least first and second spray level systems via separate spray level system pumps for absorption liquid atomization by the plurality of flattened wide spray angle nozzles; and
   passing an upward vertical flow of process gas through the wet scrubber tower for absorption liquid contact and environmental pollutant removal to produce a cleaned process gas.

10. The method of claim 9, wherein the at least first and second spray level systems are compactly arranged within approximately 0.3 to about 0.5 meter vertical height.

11. The method of claim 9, wherein the absorption liquid inlets are horizontally offset by approximately 10 degrees one from the other.

12. The method of claim 9, wherein the flattened wide spray angle nozzles provide a spray angle of approximately 150 to about 180 degrees.

13. The method of claim 9, wherein the process gas flows vertically upward through the wet scrubber tower at a velocity of about velocity of 5-15 m/s.

14. The method of claim 9, wherein the absorption liquid is a limestone slurry, an alkaline sodium solution, an ammoniated solution or an amine solution.

15. The method of claim 9, wherein the environmental pollutant is sulphur dioxide, carbon dioxide or an acid gas.

* * * * *